INVENTOR
Jacques Pouilloux
ATTORNEYS

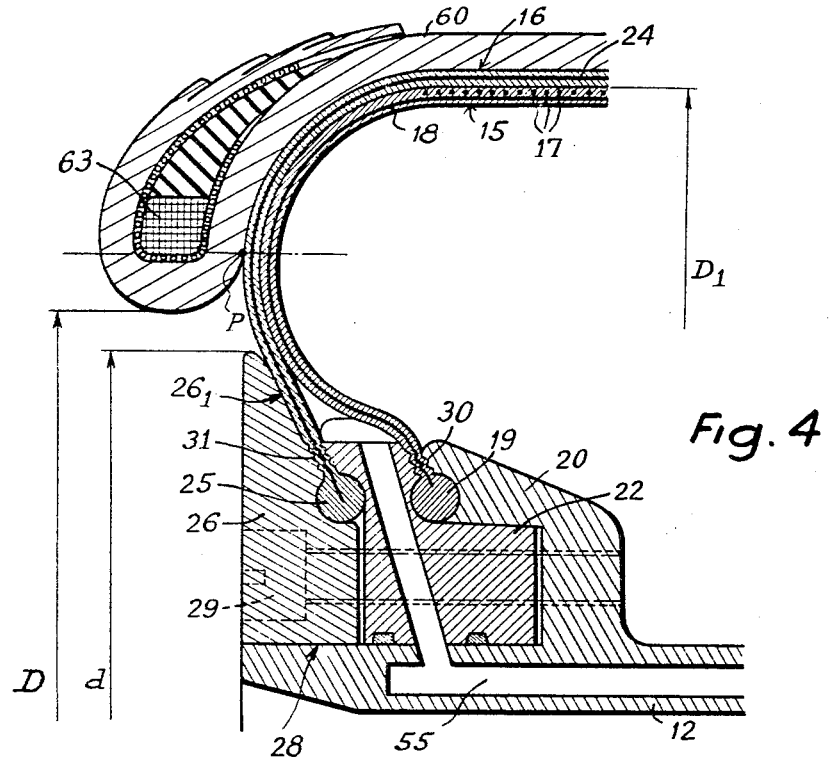
Fig. 4
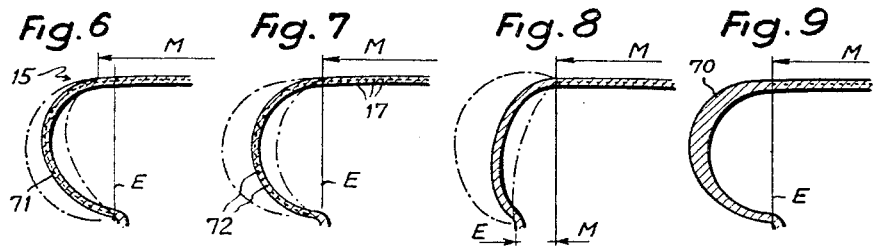
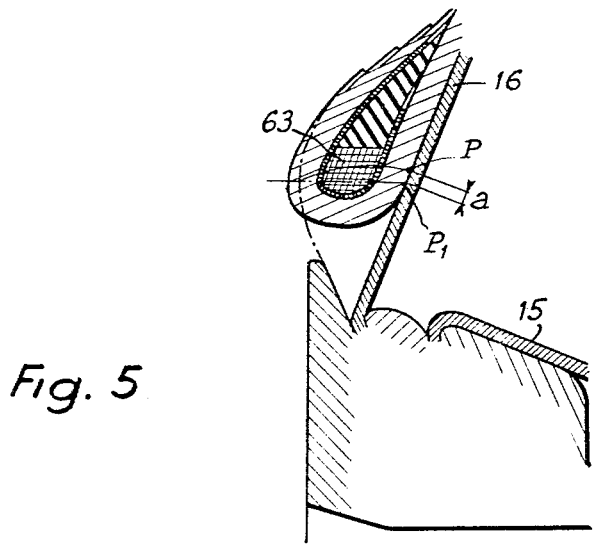
Fig. 5

United States Patent Office 3,380,872
Patented Apr. 30, 1968

3,380,872
PNEUMATIC-TIRE-BUILDING MACHINES
Jacques Pouilloux, Saint-Gratien, Seine-et-Oise, France, assignor to Pneumatiques, Caoutchouc Manufacturing et Plastiques Kleber-Colombes, Colombes, France, a French body corporate
Filed Oct. 28, 1964, Ser. No. 407,036
Claims priority, application France, Oct. 29, 1963, 952,221
30 Claims. (Cl. 156—416)

ABSTRACT OF THE DISCLOSURE

A machine for manufacturing large automotive tires, said machine being of the type comprising a mandrel or drum in which the working surface is formed by a flexible cylindrical bladder fastened to end plates, and characterized by the fact that the bladder is radially expansible and connected to the end plates by means of rounded shoulders.

---

Figure 1:
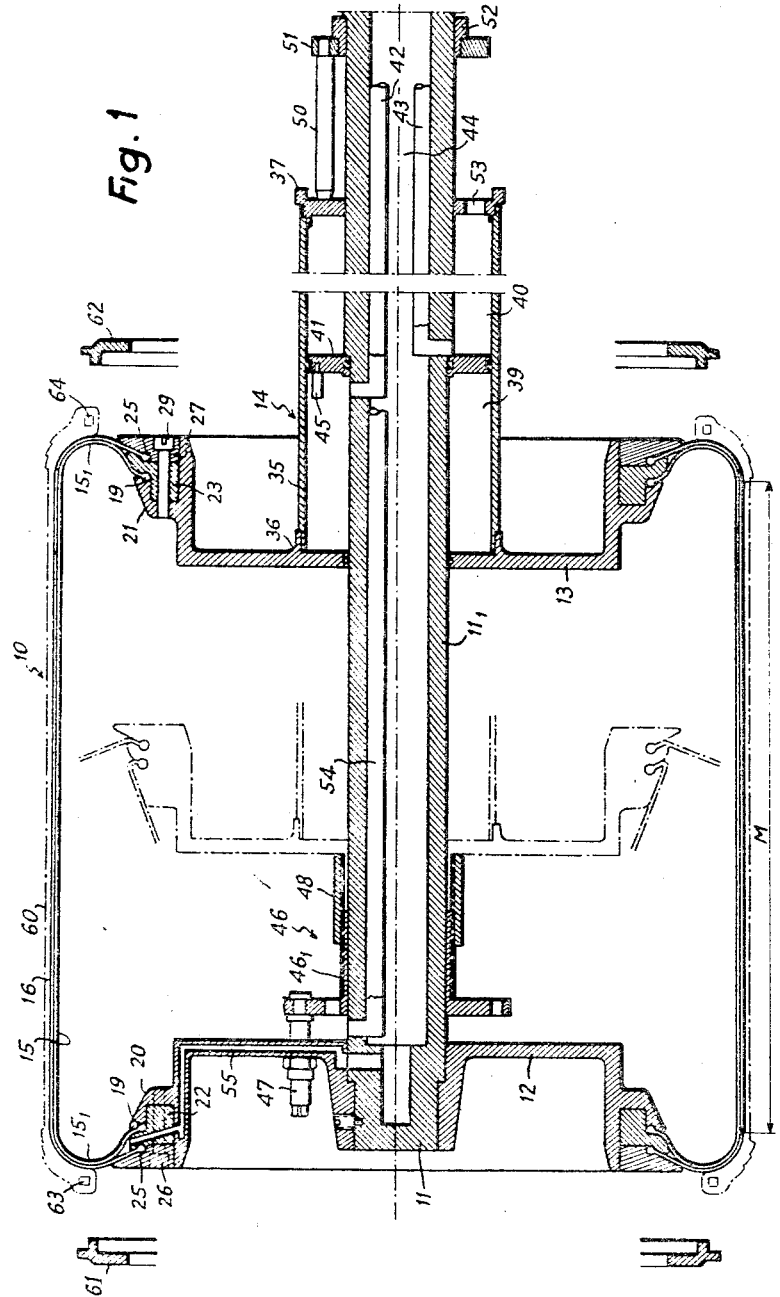

The present invention relates to improved machines for building pneumatic tires. In particular it relates to a mandrel or drum for building pneumatic tire casings of the type in which the working surface is in the form of a flexible cylindrical bladder secured to circular end plates. Mandrels of this type have been described for example in French Patents No. 1,242,880 of June 25, 1959 (U.S. P. 3,111,444) and No. 1,285,351 of January 9, 1961 (no U.S. patent) in the name of the present applicant. They have the advantage of being of a simpler construction, lighter and less expensive than the retractable mandrels made entirely of metal used up to date, and their maintenance is easier.

In order to manufacture a tire with a drum of this type, the end plates are separated from each other in such a way as to stretch the bladder and to form a cylindrical surface upon which the various layers of material and of rubber constituting the tire are applied generally, a fluid such as compressed air is introduced into the interior of the drum in order to rigidify the surface of the bladder. In the case of these drums the diameter of the cylindrical surface of the bladder is substantially equal to the diameter of the rigid end plates of the drum and in order to extract the tire carcass (which is of a generally cylindrical shape) the end plates are urged towards each other and the bladder is drawn up between the end plates, the carcass is then rocked by slightly forming into an oval shape the bead ring which is to pass over the drum. This is possible when the diameter of the ring is not much smaller than the diameter of the rigid end plates and when the ring is flexible enough to be bent sufficiently. These conditions are realised in the manufacture of tires of medium size for touring cars for example, since the diameter of the tire carcass is approximately that of the ring. But in this case the final shaping of the tire means considerable movement on the part of the elements constituting the tire, especially about the rings.

Tires for heavy vehicles have larger beads which often comprises several rings and such movements are generally not admissible to obtain beads of good quality. It is therefore necessary to place the elements adjoining the rings in positions relatively near those which they will occupy in the finished tire.

This means that the cylindrical carcass of the tire must be made with a diameter which is appreciably larger than that of the rings and as these wires are not flexible, it would be difficult, if not impossible, to disengage a tire of this type from a drum of the type described above.

Attempts have therefore been made to improve the drums of the type referred to by using reinforced flexible bladders in such a way that they can take on a cylindrical form of an appreciably greater diameter than the diameter of the end plates, the edges of the bladder having rounded shoulders near the end plates, which allows for the production of tire carcasses in which the form of the beads is very similar to their final shape in the finished tire. The contouring operation therefore does not impose too great a deformation of the bead. Furthermore the removal of the tire carcass from the drum is simplified in the case of a drum of this type with shoulders, by the fact that the diameter of the rigid end plates is less than the diameter of the carcass beads. At that moment the bladder is drawn up between the end plates and does not form an obstacle to the tire extraction movement, the tire being able to be drawn axially towards the free end of the drum. Tires with projecting shoulders of this type have been described for example in the French Patent No. 1,282,354 of Dec. 22, 1960, in the name of the present applicant.

Similarly, drums with a flexible bladder which is expansible in a radial direction by means of a fluid such as compressed air when the end plates are urged towards each other, have been produced. In the case of these drums a partial complete tire carcass of cylindrical form may be produced in a first stage upon the bladder stretched cylindrically between the separated end plates. Then in a second stage the end plates are urged together and the bladder is radially expanded in such a way as to curve the carcass in order to give it a shape similar to the final shape of the tire. If the carcass is incomplete it can be finished while contoured by locating the final elements of the tire, e.g. the breaker layer, the treads and the side walls. In any case a drum of this type allows for the production and shaping to be carried out on the same machines whereas previously these two operations were effected successively on different machines, hence a reduction in the amount of material used and in handling is obtained. Drums of this type for the assembly and contouring of tires have been described in several French patents in the name of the present applicant, among which are Patents No. 1,242,884 of July 3, 1959 (U.S. Patent No. 3,111,445) and No. 1,292,217 of Dec. 19, 1960. (U.S. patent application Serial No. 159,834.)

The invention has for an object to produce a machine for building tires which is especially suitable for large tires and which combines the special features of the two types of drum hereinbefore described, that is to say, drums in which the bladder is connected with the end plates by means of rounded shoulders, and drums comprising a radially-expansible bladder.

One of the objects of the invention is thus to produce a tire building machine comprising a tire assembly and shaping drum of the flexible bladder and shoulder type, which machine should be of relatively simple and inexpensive construction.

Another object of the invention is also to produce a drum of this type which is easily adaptable to several sizes of tire without the drum having to be changed in its entirety, in such a way as to reduce the amount of material required.

Another object of the invention is to ensure, by means of a drum of this type, a controlled shaping, that is to say, limited to an exact value by subjecting the carcass of the tire to sufficient stress during this operation.

Another object of the invention is to render the drum of the machine independent of the devices for turning the edges of the materials about the beads and of the devices for applying and securing said materials upon each other in such a way as to be able to use previously existing devices about present building machines.

According to the invention a machine for building pneumatic tires comprises, a mandrel having two circular rigid end plates mounted upon a shaft, one of said end plates being axially movable relative to the other between a proximate position and a spaced position, having an external diameter which is less than the internal diameter of the beads of the tire to be assembled, two superposed flexible tubular bladders secured by their edges to the peripheries of said end plates in fluid-tight fashion and, when said end plates are in a spaced position, forming in superposition a cylindrical surface of said mandrel, the inner of said bladders enclosing an inner chamber having a first fluid inlet, said inner bladder being reinforced by inextensible flexible elements which limit the dimensions of said cylindrical surface, the outer of said bladders enclosing an outer chamber having a second fluid inlet and radially expansible. The inner of the two tubular bladders serves as a bearing surface for the assembly and has in this position a cylindrical shape with rounded shoulders, and the outer bladder serves for the shaping of the tire. The two bladders are of appreciably the same length.

Figure 2:
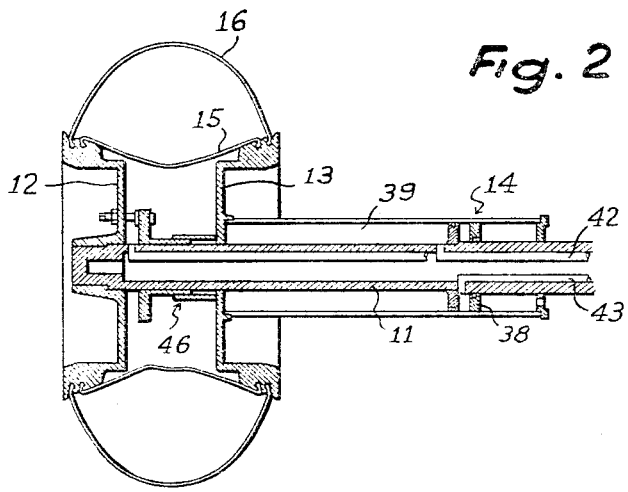
Figure 3:
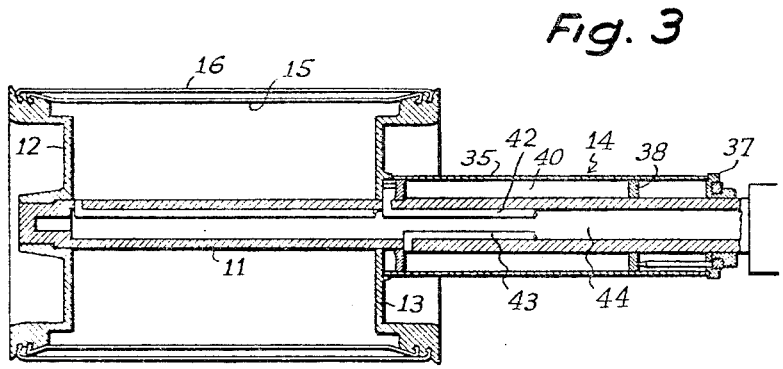
Figure 10:
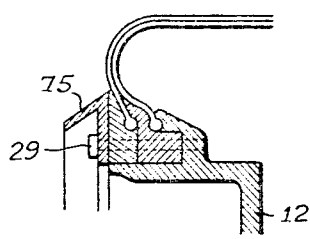

In order that the invention may be more clearly understood, reference will be made to the accompanying drawings which show some embodiments thereof by way of example and in which:

FIGURE 1 is a sectional elevation of the drum assembly of the machine in the building position, FIGURE 2 is a sectional elevation of the drum in the shaping position, FIGURE 3 is an elevation of the drum in the tire-extracting position, FIGURES 4 and 5 are detailed views on a larger scale of the shouldered section of the drum in the assembly position and in the shaping positions respectively, FIGURES 6 to 9 show various embodiments of the shoulders of the drum, and FIGURE 10 shows another modification of the end plates of the drum.

Referring now to the drawings, the drum 10 shown in FIGURES 1 to 3 comprises a central hollow shaft 11, the right hand end of which is supported in a rotary manner in bearings located in the frame (not shown) of the machine. This shaft is connected to driving means whereby it may be rotated in either direction at varying speeds in the manner of conventional drums. This shaft may also be longitudinally movable in order to regulate the position of the drum in relation to the various apparatus which are adjacently located, such as distributing devices conveying the materials and other elements of the tire and the milling or knurling devices, but in general this is not necessary. The shaft carries at one end a circular end plate 12 fixed in relation thereto. Another circular end plate 13 of the same exterior diameter and generally symmetrical is slidably mounted upon the intermediate part $11_1$ of the shaft in such a way aas to be able to be moved towards or away from the fixed plate 12 under the control of a double acting jack 14 which will be described below. Fexible bladders 15 and 16 of a generally tubular shape are fixed on the periphery of the two end plates.

The interior bladder 15 is constituted by a sheet of rubber which is centrally reinforced by means of inextensible cables 17 wound circumferentially along the whole length of the median zone M, which is approximately equal to the distance between the exterior edges of the end plates in the building position (FIGURE 1). This bladder may moreover be reinforced by longitudinally located wires 18, that is to say located in the direction of the radial planes passing through the axis of the shaft 11. These wires may extend from one edge to the other of the bladder 15 or they may only extend in the marginal section $15_1$ included between the edges and the reinforced central zone M of the circumferential wires. Alternatively these wires 18 may extend in the central zone M and beyond in the marginal section $15_1$ on each side of the central zone. These longitudinal wires 18 are intended to increase the lateral stability of the bladder 15 in the building position. In certain cases they are unnecessary, and the marginal section of the bladder then has no reinforcement. Mention will later be made of the various embodiments of these marginal sections $15_1$ of the bladder 15. The edges of the bladder 15 form circular beads 19, each of which are located in an annular seating provided in part in the peripheral edge 20 to 21 of the end plates 12 and 13 and in the annular fixing rings 22, 23 (FIGURE 4).

The second bladder 16 located outside of the first is also constituted by a sheet of rubber but it is only reinforced by inextensible flexible wires 24 located longitudinally from one edge of the bladder to the other. This bladder 16 may also be constituted by a simple sheet of non-reinforced rubber. It is of appreciably the same length as the interior bladder 15 and its original molding shape is cylindrical with an external diameter equal to the external diameter of end plates 12, 13. Its edges also form circular beads 25 which each lodge in a circular seating provided in part in the first ring 22 or 23 and in a second ring 26 or 27. The two fixing rings have the same interior diameter and are successively engaged upon a cylindrical part 28 provided on the edge of the end plates 12 and 13. These two successive rings are secured by means of circumferentially spaced screws 29, the tightening of which effects at the same time the jamming of the beads 19–25 in their respective seatings. It can be seen that in FIGURE 4 the part of the bladders 15 and 16 immediately adjacent to the beads is locked between the undulating or notched surfaces 30–31 provided on the edge 20 of the end plates and upon the fixing rings 22–26 in such a way as to produce, with the locking of the beads, an excellent clamping of the bladders and at the same time excellent sealing of the securing of these sections of the bladders forming joints. These notched surfaces 30–31 may be done away with if it is intended to locate wires in the beads 19–25 of the diaphragm. It will also be observed from FIGURE 4 that the exterior bladder 16 rests along part of its length adjacent its bead, on the internal tapered surface $26_1$ of an exterior edge of the fixing rings 26, which has the effect of also giving lateral stability to the assembly of the two diaphragms in the building position. The exterior diameter "$d$" of this edge is substantially smaller than the interior diameter "D" of the beads of the tire to be produced. The edges 20–21 of the end plates and the rings 22–23 have themselves an exterior diameter less than the diameter "$d$" of the rings 26–27 in order to provide seating for any undulations of the interior bladder 15 when the drum is in the position shown in FIGURE 3. The bridges of the ring and of the end plates are moreover rounded in order not to harm the bladders or the tire. Because of this mounting the bladders 15–16 may easily be dismounted either to change them or to replace them by bladders of a different length in order to produce tires of different sizes.

The displacement of the movable end plate 13 on the shaft 11 is effected by the jack 14. This jack comprises a cylinder 35 fixed at one end to an external circular edge 36 of the movable end plate 13 and at the other end to a disc 37 which can slide upon the shaft 11. In front of the disc 37 the cylinder carries a circular base 38 sliding upon the shaft with the interposition of a sealing joint and ensuring the closure of the interior space of the cylinder. This interior space of the cylinder is divided into two annular chambers 39 to 40 by means of a disc 41 fixed to the shaft 11. Each chamber of this jack may be fed with compressed air, or opened to the atmosphere by means of two tubes 42–43 lodged in the interior channel 44 of the shaft and passing through the wall of this shaft by means of holes located on either side of the separation disc 41. A finger 45 placed upon this disc limits the distance of the movable end plates 13 and prevents it from closing the aperture of the tube 42. Sealing joints are provided upon the jack discs and between the movable end plate and the shaft. It can be seen that the displacement of the movable cheek 13 in one direction or the other is controlled by conveying compressed air into one or other of the chambers 39–40 of the jack.

The movement of the movable end plate 13 towards the fixed plate 12 is limited by means of a stop member 46 connected to the fixed plate 12 and controllable from outside. This stop member comprises a cylindrical supporting part $46_1$ which can slide upon the shaft under the action of the control screw 47 and a socket 48 screwed upon the support $46_1$. Before mounting, the relative position of the support and the socket 48 is regulated to obtain the desired length of the stop member. After building, a more accurate control of the position of the stop member may be obtained by means of the screws 47.

The movement of the movable end plate 13 away from the fixed plate 12 is limited by another stop member 50 upon which the disc 37 abuts. This stop member 50 is retractable in order to allow the movable plate 13 to take up two separated positions. This stop member 50 may be formed, as shown in FIGURE 1, by fingers parallel to the shaft 11 and carried by a ring 51 which can turn upon a support 52 fixed to the shaft. In one position the fingers 52 abut against the disc 37. In another position the fingers 50 have been turned at an angle and are, by means of holes 53, inserted into the disc 37 in such a way that they can pass into this disc to allow the movable plate 13 to move farther away from the fixed plate towards the right (FIGURE 3). Other systems of retractable stop members may be used to the same effect.

The interior space of the drum between the interior bladder 15, the plates 12 and 13 and the shaft 11, may be fed with compressed air by means of a tube 54 passing longitudinally into the shaft and opening on the interior of the drum near the fixed plates by means of a hole bored traversely in the shaft. This same tube may also be used to lower the pressure in the drum.

The space between the two bladders may also be fed with compressed air or the air therein be allowed to escape by means of a series of channels 55 passing through the thickness of the fixed plate 12 and of the fixing ring 22 in order to open on the one hand between the two bladders 15 and 16 and on the other hand in the interior channel 44 of the shaft 11, or a space is reserved between the tubes 42, 43 and 54 to allow circulation of air. All these ducts discharge at the right-hand end of the shaft which extends beyond the other side of the frame of the machine and are connected to a distribution system (not shown) allowing the compressed air to be directed, and to be evacuated towards the atmosphere or to be sucked in to create a low pressure within the drum.

The drum hereinbefore described is used in the following manner.

In order to locate the drum in the building position (FIGURE 1) compressed air is introduced into the drum by means of the tube 54, which has the effect of pushing the movable plate 13 back towards the right until the disc 37 abuts against the stop member 50 selected to give the desired breadth to the drum. At the same time the interior bladder 15 is distended and takes on at its central part M a cylindrical form determined by the diameter of the coil of its circumferential reinforcement wires 17. The diameter $D_1$ of this cylindrical section M is substantially greater than the diameter "D" of the beads of the tire to be manufactured, then the exterior diameter "$d$" of the end plates. By way of example, the diameter $D_1$ may be of the order of 120% of the diameter "$d$." The marginal zone $15_1$ of this bladder either only has a longitudinal reinforcement 18 or no reinforcement at all and consequently tends to swell and to take on a balancing semi-toroidal shape joining up with the peripheral edges of the end plates. The space between the two bladders now having been evacuated, the exterior bladder 16 is distended and presses closely upon the interior bladder 15 taking on the same shape. If the interior bladder 15 has no longitudinal reinforcement 18 in its marginal zone forming the shoulders $15_1$ of the drum, the exterior bladder 16 which has such reinforcement 24 then directly intervenes to limit the development of these marginal zones and to determine the shape of the shoulders of the drum as shown in FIGURES 1 and 4.

In the position as shown in FIGURE 1, the air pressure on the interior of the drum allows a sufficiently rigid cylindrical form to be obtained to allow the operator to locate the canvas of the carcass 60 and to knurl or mill it to remove the air and to bend down the edges onto the rounder shoulders of the drum. The head locating hoops 61–62 are then brought forward and these draw the wires 63–64 against the canvas applied on the shoulders of the drum. The operator then bends down the edges of the canvas about the wires 63–64, puts any supplementary canvas in position and carries out a milling operation in order to press them against each other. Thus other series of canvas and of wires can be applied if the tires are very large. It will be noticed that the sharply accentuated form of the drum shoulders and the shape of the fins of the end plates 12–13 which slope towards the interior, allow for the use of conventional turning devices for the edges of the canvas without it being necessary to provide special devices for a drum of this type.

Once the carcass of the tire has thus been produced, compressed air is conveyed into the space between the two bladders 15 and 16 through the shaft 11 and the channels 55 of the fixed plate. This brings about a radial extension of the exterior bladder 16 and the shaping of the carcass 69. Where the shaping is insufficient, compressed air is introduced into the chamber 39 of the jack to bring the movable plate 13 closer to the fixed plate 12. The other elements of the tire carcass can then be located upon the shaped carcass. It should be noted that the shaping is progressive and that it can be stopped at intermediate stages allowing certain elements to be located and then be re-started and continued until the movable plate 13 is stopped by the adjustable stop member 46. This progressive shaping is obtained by controlling the pressure of the air in the jack 14 and in the space between the two bladders.

After the shaping, the tire has to be extracted from the drum by making it slide towards the left. This extraction is especially simplified even in the case of large tires comprising very stiff beads because the exterior diameter "$d$" of the end plates 12–13 is substantially smaller than the interior diameter of the beads in such a way that a simple sliding movement is sufficient without a deformation of the wires being necessary. However, starting from the contoured position of FIGURE 2 the bladders 15 and 16 must first be brought back between the end plates. There are two ways of doing this. The first is to leave the plates 12–13 in the approached position as shown in FIGURE 2, and draw in the bladders by creating a low pressure by means of the channels 55 of the fixed plate and by means of the tube 54 so that the bladders 15–16 return between the plates. The second method is that of urging the movable plate 13 away towards the right after having retracted the stop member 50, and by conveying compressed air into the rear chamber 40 of the jack 14 and at the same time evacuating the interior of the the drum or lowering the pressure therein. The exterior bladders 16 distends between the plates and takes on a cylindrical form of a diameter lower than the diameter "$d$" of the end plates (FIGURE 3). This second method is preferable in that it allows a more certain detachment of the exterior surface of the bladders 16 from the interior surface of the tire. Furthermore, the cylinder formed by the bladder 16 forms a support for the right bead of the tire while the tire is being slid to extract it from the drum.

Given the rounded shape of the shoulders of the drum in the building position, it is possible to obtain at the moment of shaping, a favourable stressing of the tire carcass in spite of the inextensible reinforcement of the exterior bladder 16, owing to the following phenomenon. In the course of building, the wire 63 of the tire is located at the level of the circle P of the rounded shoulder of the drum (FIGURE 4). At the moment of shaping, the exterior diaphragm 16 pivots about its securing point and takes up the position indicated in FIGURE 5. Because the wire is inextensible, the bead of the tire slides in relation to the bladder 16 and is finally located at the level of the circle $P_1$ of the distended bladder, the difference "$a$" between P and $P_1$ measuring the relative sliding which is thus produced on each side of the drum. The result is that the length of the exterior bladder 16 between the beads of the tire is greater in the shaping position than in the building position in such a way that said bladder transmits to the carcass an increase in stress allowing the materials of the carcass to be well stretched. However, since the reinforcement 24 of the bladder 16 is inextensible, this increase in stress is limited and there is no risk of the contouring being excessive or of its causing ruptures or troublesome relative displacements of the elements constituting the beads.

Mention has been made above of the fact that the reinforcement elements of the interior bladder 15 gives to this bladder when it is under pressure a cylindrical form connecting it to the rigid circular end plates by means of the rounded shoulders 15 of considerable height. This rounded shape is appreciably semi-toric when the distance between the plates 12 and 13 in the building position (FIGURE 1) locates the beads 19 of the bladder on the right of the edges of the median zone M. However this rounded form of the shoulders $15_1$ may be modified by adjusting the distance between the end plates. Thus a more or less protruding form may be obtained by moving the bracing plane E of the bladder either towards the interior (FIGURE 6) or towards the exterior (FIGURE 8) in relation to the edge of the cylindrical zone M, the median position being realised when the plane E coincides with the edge of the zone M (FIGURE 7). The most projecting shapes according to FIGURES 6 and 7 are preferable because they give to the drum more detached shapes aiding the passage of the members for bending over the edges of the canvas of the carcass. The rounded shape can again be modified by varying, during construction of the bladder, the length of the shoulders or the length of the longitudinal reinforcement elements 18 extending in the shoulders $15_1$ as shown by the broken lines in FIGURES 6, 7 and 8. Then again the balanced shape of the shoulders $15_1$ obtained by means of a reinforcement and given relative positions may be modified by locally increasing the rigidity of the shoulders, for example, by means of thicknesses of rubber 70 (FIGURE 9).

Mention has also been made of the fact that the presence of flexible longitudinal reinforcements 18 in the shoulders $15_1$ affords good lateral stability to the bladder under pressure. If it is desired to increase this lateral stability even more, the shoulders $15_1$ may be bound by means of a flexible reinforcement 71 of material cut on the bias (FIGURE 6) or by means of flexible circumferential elements 72 (FIGURE 7).

FIGURE 10 shows another modification which can be made to the drum as described, which modification consists in providing a tapered surface 75 upon the exterior face of the end plates 12–13. In the course of building, when the edges of the canvas of the carcass are bent downwards, they are applied against this tapered surface 75 to which they adhere while the rings 61 and 62 carrying the wires 63 and 64 are brought towards them. For controlling the displacement of the cheeks, instead of the jack 14, a hydraulic jack system may be used which is concentric with the shaft or located parallel thereto in the frame of the machine and transmitting the translation movement by means of a stop member mounted on ball bearings or again by a jack system located on the interior of the drum between the two plates 12 and 13, said system being of the type described in the French Patent 1,288,755 of Feb. 10, 1961 (no corresponding U.S. patent) in the name of the present applicant. The movements towards and away from each other of the end plates may also be controlled by means of a purely mechanical device such as that described in the patent application No. 949,485 filed Oct. 3, 1963, relating to a "Tyre Building Machine," said control device allowing for the symmetrical displacement of the end plates by means of a screw located in line with the shaft. In this case the left-hand plate is fixed to the extremity of the shaft itself while the right-hand plate is fixed to a sheath slidably mounted upon the shaft. In order to rotate the drum, the transmission mechanism described in this patent application may be also applied to this machine.

The invention is obviously not limited to the specific details of construction disclosed herein but is capable of other modifications and changes without departing from the spirit and scope of the appended claims.

I claim:

1. A pneumatic-tire-building machine, comprising a mandrel having two circular rigid end plates mounted upon a shaft, one of said end plates being axially movable relative to the other between a proximate position and a spaced position, having an external diameter which is less than the internal diameter of the beads of the tire to be assembled, two superposed flexible tubular bladders secured by their edges to the peripheries of said end plates in fluid-tight fashion and, when said end plates are in a spaced position, forming in superposition a cylindrical surface of said mandrel, the inner of said bladders enclosing an inner chamber having a first fluid inlet, said inner bladder being reinforced by inextensible flexible elements which limit the dimensions of said cylindrical surface, the outer of said bladders enclosing an outer chamber having a second fluid inlet and radially expansible.

2. A pneumatic-tire-building machine according to claim 1, wherein said fluid is air and said bladders are of a length greater than the distance between the end plates.

3. A pneumatic-tire-building machine according to claim 1, wherein said elements are located circumferentially.

4. A pneumatic-tire-building machine according to claim 3, wherein said elements are distributed over substantially the whole of said surface.

5. A pneumatic-tire-building machine according to claim 3, wherein said elements are separate rings.

6. A pneumatic-tire-building machine according to claim 3, wherein said elements are the turns of a cylindrical coil.

7. A pneumatic-tire-building machine according to claim 1, wherein when said plates are in said spaced position said cylindrical surfaces are bounded by shoulders of approximately semi-toroidal shape.

8. A pneumatic-tire-building machine according to claim 3, wherein said circumferential elements are distributed only over the central cylindrical zone.

9. A pneumatic-tire-building machine according to claim 1, wherein the diameter of said cylindrical surface is appreciably greater than the diameter of the beads of the finished tire.

10. A pneumatic-tire-building machine according to claim 1, wherein said inner bladder is also reinforced by substantially inextensible elements disposed longitudinally to said cylindrical surface, so as to limit the axial length of said inner bladder.

11. A pneumatic-tire-building machine according to claim 10, wherein said longitudinal elements extend into the toroidal section of said bladder.

12. A pneumatic-tire-building machine according to claim 7, wherein said circumferential elements extend into said shoulders.

13. A pneumatic-tire-building machine according to claim 7, wherein said shoulders are reinforced by bias-cut fabric.

14. A pneumatic-tire-building machine according to claim 7, wherein said shoulders are reinforced by extra layers of rubber.

15. A pneumatic-tire-building machine according to claim 9, wherein the ratio of the diameter of said cylindrical surface to the diameter of the beads of the finished tire is about 120%.

16. A pneumatic-tire-building machine according to claim 1, wherein said outer bladder is reinforced by means of substantially inextensible elements disposed in a longitudinal direction in order to limit the radial expansion of said bladder when said end plates are in a proximate position.

17. A pneumatic-tire-building machine according to claim 1, wherein the one end plate is fixed to the extremity of the shaft while the movable end plate is mounted slidably upon a shaft, stop members being provided to limit its proximate and spaced positions.

18. A pneumatic-tire-building machine according to claim 17, wherein the stop member limiting the proximate position of the movable end plate comprises a tubular support coaxially and slidably mounted upon the shaft and a socket screwed upon said support, whereby the length of said stop may be adjusted.

19. A pneumatic-tire-building machine according to claim 18, wherein the axial position of the tubular support of said stop member is adjustable from the external side of the fixed plate by means of a screw passing through said end plate.

20. A pneumatic-tire-building machine according to claim 17, wherein the stop member limiting the spaced position of the movable end plate may be adjusted to a non-operative position to allow a supplementary spacing of the movable plate from the fixed end plate in order to reduce the diameter of the cylindrical surface to the diameter of the end plates so as to facilitate the removal of the finished tire.

21. A pneumatic-tire-building machine according to claim 17, wherein the stop member limiting the distance of the movable end plate comprises a finger longitudinal to the shaft, fixed in translation but rotatable relative to the shaft so as to abut, when in one rotary position, upon a disc fixed to the movable end plate and, when in another rotary position to move through a gap in said disc, thus allowing a supplementary spacing of said end plates.

22. A pneumatic-tire-building machine according to claim 1, wherein said first fluid inlet is connected to fluid pressure control means by means of a channel in the hollow shaft and a channel provided in a thickness of the fixed end plate.

23. A pneumatic-tire-building machine according to claim 1, wherein the movable end plate is actuated by means of a pneumatic jack.

24. A pneumatic-tire-building machine according to claim 1, wherein the movable end plate is actuated by means of a hydraulic jack.

25. A pneumatic-tire-building machine according to claim 23, wherein the jack comprises a cylindrical body concentric with the shaft, fixed on one side to the movable end plate, and its interior is divided into jack chambers by means of annular wall integral with the shaft.

26. A pneumatic-tire-building machine according to claim 25, wherein the jack operating fluid enters the jack chambers and said inner and outer chambers through supply lines along the bore of the shaft.

27. A pneumatic-tire-building machine according to claim 1, wherein the end plates are provided, externally adjacent to the edges of said bladders, with a tapered surface to facilitate assembly of the edges of the sheet material of the tire carcass.

28. A pneumatic-tire-building machine according to claim 1, wherein the said bladders are clamped between notched surfaces in said end plates.

29. A pneumatic-tire-building machine according to claim 1, wherein the edges of said bladders are in the form of circular beads which may be held in annular seatings in said end plates.

30. A pneumatic-tire-building machine according to claim 29, wherein said beads are reinforced by wires.

References Cited

UNITED STATES PATENTS

| | | | |
|---|---|---|---|
| 2,988,132 | 6/1961 | Vanzo et al. | 156—416 X |
| 3,160,545 | 12/1964 | Burton | 156—416 X |
| 3,184,361 | 5/1965 | Allitt | 156—416 X |
| 3,234,070 | 2/1966 | Pouilloux | 156—416 |
| 3,235,435 | 2/1966 | Pouilloux | 156—416 X |

EARL M. BERGERT, *Primary Examiner.*

HAROLD ANSHER, *Examiner.*